United States Patent [19]

Pexton et al.

[11] 4,328,521
[45] May 4, 1982

[54] GIMBAL SPRING RETAINER

[75] Inventors: Harold W. Pexton, Moore; Robert A. Smith, Oklahoma City, both of Okla.

[73] Assignee: Magnetic Peripherals Inc., Minneapolis, Minn.

[21] Appl. No.: 138,032

[22] Filed: Apr. 7, 1980

[51] Int. Cl.³ .................... G11B 5/58; G11B 17/32; G11B 21/20
[52] U.S. Cl. ................................ 360/104; 360/105; 360/99
[58] Field of Search ............... 360/104, 103, 105, 106, 360/107, 99, 128

[56] References Cited

U.S. PATENT DOCUMENTS

| | | | |
|---|---|---|---|
| 3,946,439 | 3/1976 | Castrodale et al. | 360/99 |
| 3,975,774 | 8/1976 | Helbers | 360/105 |
| 4,151,573 | 4/1979 | Tandon et al. | 360/104 |
| 4,167,766 | 9/1979 | Chau | 360/104 |
| 4,218,714 | 8/1980 | Isozaki et al. | 360/99 |
| 4,247,877 | 1/1981 | Keller et al. | 360/104 |

Primary Examiner—Alfred H. Eddleman
Attorney, Agent, or Firm—Frederick W. Niebuhr; Joseph A. Genovese

[57] ABSTRACT

In a data processing device using flexible magnetic disc media, apparatus is disclosed for improved positioning of a magnetic read/record head against the recording surface of a magnetic disc. A carriage, moveable radially on the disc, has two opposed swing arms pivotal between a load position and a retracted position. A gimbal spring is cantilevered to each swing arm and carries at its free end a transducer. A retainer is attached to the end of each swing arm. During movement of the swing arm toward the load position, each retainer is engaged with its associated gimbal spring and maintains its associated head in a controlled attitude as the head approaches the disc. In the load position, the heads are opposite one another against recording surfaces on opposite sides of the disc, and each is free of its associated retainer. As the swing arms are moved from the load position toward the retracted position, each retainer engages its associated gimbal spring to pull the associated head from the disc surface in a controlled attitude.

6 Claims, 11 Drawing Figures

GIMBAL SPRING RETAINER

BACKGROUND OF THE INVENTION

In that area of data processing concerned with data storage, magnetic disc products have become increasingly important. This is due to random access to data and a wide variety of storage capacities, access times and other features for tailoring to specific applications. For example, a module or group of fixed discs in a single drive can have a storage capacity of up to 400 megabytes. On the other hand, a drive utilizing a single flexible disc may have a capacity of from ½ to 2 megabytes, and of course, costs less.

The flexible disc is made of a non-magnetic material, for example a polyethylene or polyester. It is typically 0.003 inches (0.08 mm) thick, and can have a diameter of 8 inches (20.5 cm) or 5 inches (13 cm). At its center is a circular drive hole. For storage of data, each disc recording surface is provided with series of concentric tracks between the drive hole and the disc outer edge, usually at a density of 48 tracks per inch, or approximately 0.53 mm apart from one another.

Flexible and not self-supporting, the disc is permanently enclosed in a jacket of plastic or stiff paper. The jacket has at least two openings; a circular opening at the center corresponding to the drive hole of the disc, and an elongated slot directed radially of the disc through which a read/record heads have access to the disc recording surface.

A disc drive apparatus is used for writing and reading data. The drive includes a housing in which the disc is enclosed, and structure for rotating the disc relative to the housing, e.g., a rotatable spindle, a cone or collet for clamping the disc to the spindle and a motor for rotating the spindle and cone. The drive further includes a carriage movable radially of the disc. Mounted pivotally on the carriage is a swing arm, or—in connection with a two-sided flexible disc—two opposed swing arms. A gimbal spring is mounted in cantilever fashion with respect to each swing arm, and carries at its free end a read/record head. Each gimbal spring has a dimple or up-raised portion centered on its associated head. A stiffener, attached to the gimbal spring, contacts the dimple and urges the head against its associated recording surface whenever the swing arms are in their load position. A desired location on the disc surface is reached by selecting the disc angular position and carriage radial position corresponding to such location.

The gimbal spring is designed to give the head nearly instantaneous pitch and roll capability to follow any irregularities in the disc recording surface. The stiffener and dimple provide a pivot point about which the head can pitch and roll. The combination of stiffener and dimple is shown in U.S. Pat. No. 3,896,495 to Beecroft granted July 22, 1975, and in U.S. Pat. No. 4,089,029 to Castrodale et al granted May 9, 1978. As is taught in the Beecroft reference, the selection of materials and design of the gimbal spring can enhance the rapid pitch and roll capability, principally by minimizing the spring constant of the gimbal, i.e., the force required per unit length of elastic spring deflection.

Yet another requirement of the gimbal spring, however, is its ability to support the read/record head in a controlled attitude, particularly when the head is not held against the disc recording surface. The importance of stability when the head is removed from the disc is that if a head is free to dangle near the disc, its edges can strike the recording surface, damaging the head, the disc surface or both and causing loss of data.

The need for head stability is recognized in the Castrodale reference, which shows a pair of fingers integral with the stiffener. In the reading and recording (loaded) position, these fingers are free of the gimbal spring. As the head is retracted, the stiffener is removed from the dimple and subsequently the fingers engage the gimbal to stabilize the head. In head loading, the fingers are disengaged from the gimbal prior to stiffener-dimple contact. Head loading and retraction thus involve brief spans of time during which neither the fingers nor the stiffener contacts the gimbal spring, and the spring alone supports the head. Consequently, to avoid head and disc injury, the gimbal spring must be sufficiently rigid to control head attitude. Yet increased stiffness reduces the head's capability to follow disc undulations and surface irregularities. Another problem, which occurs at each loading, is the shock to the head caused by impact of the stiffener against the dimple. The resulting vibrations can cause damage and reduce head life.

It is an object of this invention to positively control the head attitude in order to eliminate the possibility of damage to the head or disc recording surface. A further object of the invention is to accomplish head attitude control independently of the gimbal spring stiffener. Yet another object is to eliminate the shock caused by stiffener impact against the dimple.

SUMMARY OF THE INVENTION

To accomplish these and other objects, there is provided a reading and recording apparatus having a housing with means for supporting a magnetic disc rotatably with respect to the housing. The apparatus includes a carriage and means for moving the carriage radially with respect to the magnetic disc. The carriage has at least one swing arm mounted pivotally thereto. One head carrier is mounted at its proximal end to each swing arm, and supports at its distal end a read/record head for movement toward and away from the swing arm. A moving means pivots each swing arm between a loaded position wherein the head is positioned in a reading and recording relation to the disc, and an open position in which the head is comparatively remote from the disc. Detent means, integral with each swing arm, contact the carrier upon movement of the head a predetermined distance from the swing arm, and thereby prevent further movement of the head away from the swing arm.

In the preferred embodiment of the invention, the head carrier is a gimbal spring, i.e., a leaf-spring mounted in cantilever fashion to the swing arm. The gimbal spring has a base or proximal end mounted to the swing arm, two legs extended therefrom, and has, at its distal end, a head support flexure carrying the head. Mounted proximate the gimbal spring base is a stiffener which continually contacts a dimple on the head to continually bias the head away from the swing arm.

The preferred detent includes a retainer directly attached to the swing arm near the head support flexure of the gimbal spring. The detent is rigid and unitary and includes a landing or lift spaced a predetermined distance from the swing arm. The lift includes prongs extended so as to engage the support flexure of the gimbal spring when the spring and head have traveled a predetermined distance away from the swing arm and thus prevent further movement of the spring away from the swing arm. The prongs each extend a sufficient length along the flexure to prevent movement about the roll axis, while the prongs are sufficiently spaced apart and on opposite sides of the gimbal spring to prevent movement about the pitch axis.

The spacing of the lift from the swing arm is such that when the swing arm is in the load position, the disc recording surface supports the head and gimbal spring flexure sufficiently near the swing arm so that the flexure is completely free of the lift. As the swing arm is retracted or moved away from the recording surface, the lift moves with the swing arm to positively engage the gimbal spring. At that point, it is the lift which supports the head and not the recording surface. As the lift is not integral with the stiffener, but integral with the swing arm, the stiffener pressure can remain on the dimple throughout operation, loading and unloading. There is no time span in which the gimbal spring is entirely free of other supporting structure. The head is never supported solely by the gimbal spring. This eliminates head dangling or free movement and greatly reduces the potential for damage to the disc and head surfaces.

IN THE DRAWINGS

Other features and advantages will become apparent upon reading of the following detailed description and reference to the drawings in which.

DETAILED DESCRIPTION OF THE PREFERRED EMBODIMENT

Figure 1:
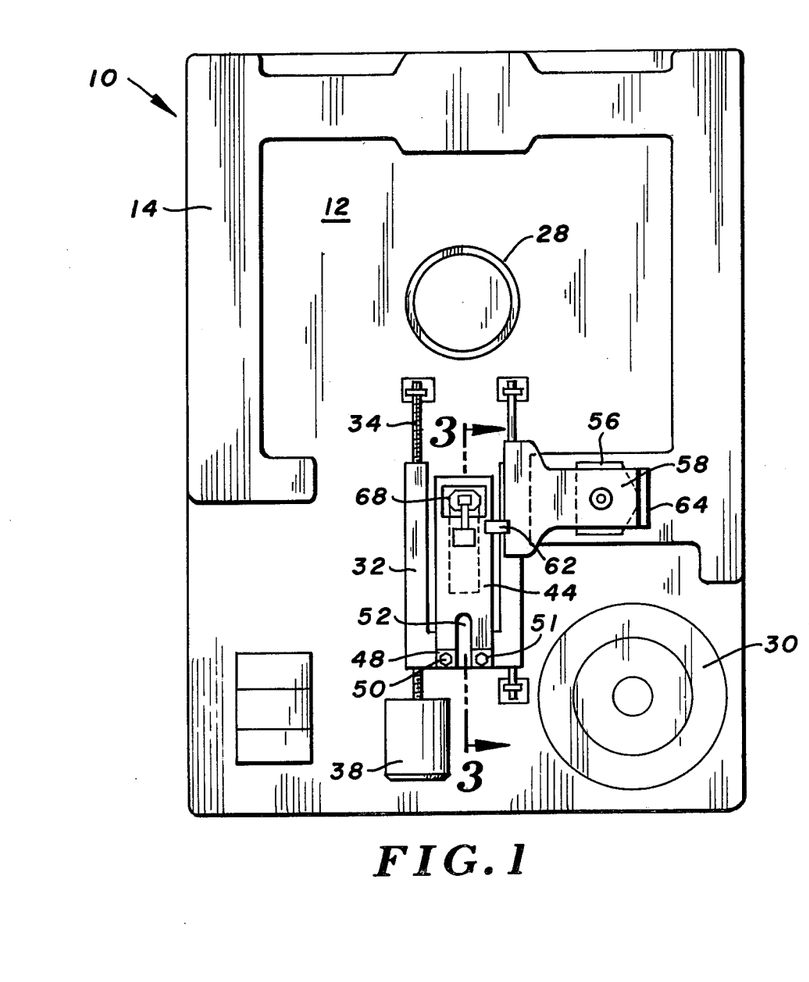
FIG. 1 is a top schematic view of a disc drive apparatus for double-sided flexible discs.
Figure 2:
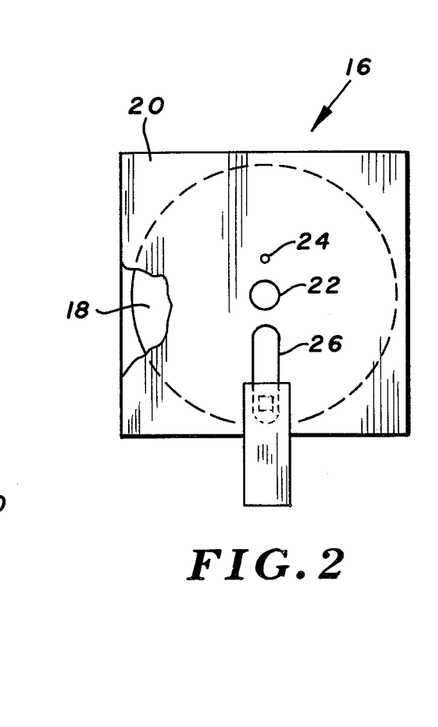
FIG. 2 illustrates a disc cartridge for use in the drive of FIG. 1.

Referring to the drawings, there is shown in FIG. 1 a disc drive mechanism 10 adapted for use with flexible or "floppy" magnetic discs. Drive 10 has a base 12, a portion of which is raised to form a deck 14 suitable for supporting a disc cartridge 16 such as that shown in FIG. 2. The disc cartridge includes a disc 18 of a flexible and non-magnetizable material such as a polyester or other plastic coated with a substance capable of holding magnetic flux such as magnetic oxide. Disc 18 has a thickness on the order of 0.003 inches (0.08 mm) and a diameter of 8 inches (20.5 cm). As the disc is non self-supporting, it is enclosed in a jacket 20 of plastic or stiff paper. Jacket 20 has a circular central opening corresponding to a drive hole 22 in disc 18, an alignment opening 24, and an elongated slot 26 directed radially of the disc. An elongated opening directly opposed to slot 26 is located on the opposite side of jacket 20.

For reading and recording of data, disc cartridge 16 is placed upon deck 14 with drive hole 22 at least approximately centered on a spindle 28 of mechanism 10. A top or clamshell of the drive mechanism, not shown, carries a collet or cone which, when the clamshell is closed, clamps onto the spindle to secure disc 18 for rotation about an axis centered on the spindle. A drive motor 30 is provided to rotate the spindle by means of a belt and pulleys or other suitable linkage.

Formed on each recording surface of disc 18 is a series of circular data tracks concentric about drive hole 22. Typically there are 48 of these tracks per radial inch of disc 18 for a centerline spacing of 0.53 mm between adjacent tracks. Upon each track, states of magnetic flux representing bits of data are positioned. Thus, with a transducing (read/record) head positioned above a particular track, a desired portion of data located on the track can be reached simply by rotation of disc 18 to the angular position required.

To move a recording head from one data track to another, a carriage 32 is provided. Carriage 32 is mounted on a worm conveyor 34 which can be caused to rotate in either direction by a stepper motor 38. Carriage 32 has a worm follower, not shown, which is threaded so as to follow the threads of conveyor 34. Consequently, as conveyor 34 is rotated by the stepper motor, carriage 32 can be caused to move radially of disc 18, i.e., upward or downward in FIG. 1. Carriage 32 is further mounted slideably on a guide rod 40, which counteracts any tendency in the carriage to rotate as the worm conveyor is rotated. Other well known carriage moving means, e.g., a steel band, could be used with equal facility. Using the combination of radial carriage movement and rotation of disc 18 with spindle 28, any point on the disc recording surface can be reached by a transducing head carried by the carriage.

Figure 3:
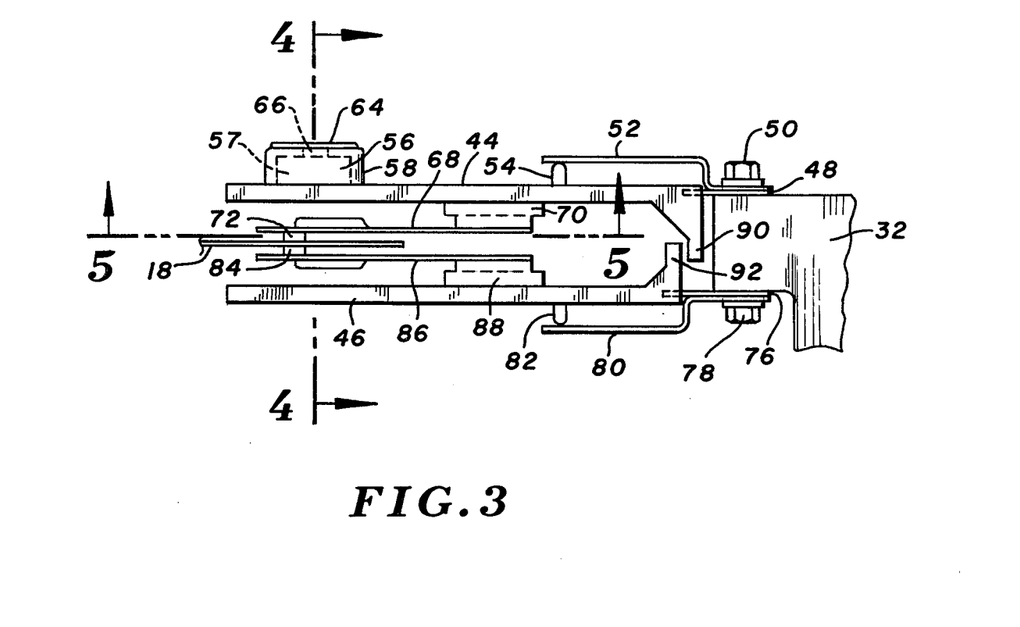
FIG. 3 is a sectional view taken along the lines 3—3 in FIG. 1.

Mounted to carriage 32 are an upper swing arm 44 and a lower swing arm 46. As is seen from FIG. 3, swing arms 44 and 46 are generally symmetrical about the horizontal plane containing disc cartridge 16. Upper swing arm 44 is supported by an upper spring hinge 48 mounted to the swing arm and attached to carriage 32 with upper bolts 50 and 51. Hinge 48 is sufficiently flexible to allow pivoting of swing arm 44 about an axis transverse to the length of the swing arm and located proximate the rear of upper swing arm 44. This allows swing arm 44 to pivot with respect to carriage 32: between a load position (FIG. 3) in which the swing arm is generally horizontal and the transducing head it supports is against the recording surface of disc 18; and a retracted position in which the free end of the swing arm, along with the head, is comparatively remote from the disc. An upper leaf-spring 52 contacts an upper boss 54 of the swing arm and continually biases the swing arm toward its loaded position.

Figure 4:
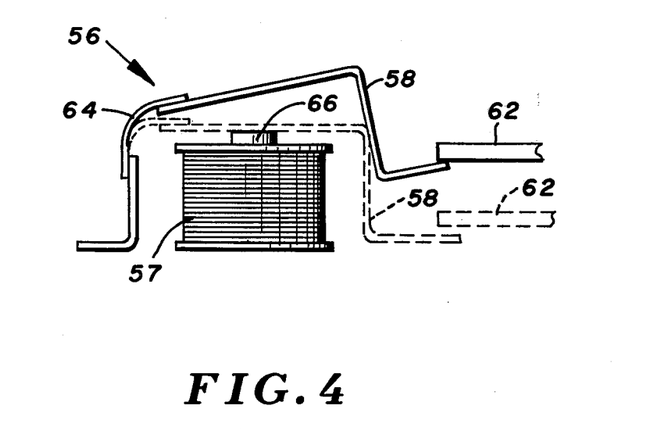
FIG. 4 is a sectional view taken along the lines 4—4 in FIG. 3.

The pivoting of upper swing arm 44 is controlled by a solenoid 56 mounted on deck 14. As seen from FIG. 4, solenoid 56 includes an electromagnetic coil 57 and an armature 58 of a magnetizable material. One end of armature 58 is located beneath a tab 62 of swing arm 44 (see FIG. 1). An armature leaf-spring 64 biases armature 58 away from a contact 66 of the solenoid to a position shown in solid lines, thereby to maintain upper swing arm 44 in the retracted position against the force of upper leaf-spring 52. When solenoid 56 is energized, armature 58 is attracted to contact 66 and assumes the position shown in broken lines. This allows spring 52 to move the swing arm to its loaded position.

An upper gimbal spring 68 is mounted at its rearward or proximal end to an upper projection 70 of arm 44. Attached to the distal end of spring 68 in an upper read/record head 72. Gimbal spring 68 is essentially a cantilever beam, and supports head 72 for movement toward and away from arm 44 and, with the swing arm loaded, movement normal to the plane of disc 18.

To accommodate two-sided flexible discs, carriage 32 supports lower swing arm 46 pivotally by a lower spring hinge 76 mounted to arm 46 and attached to carriage 32 by two lower bolts, one of which is shown at 78. A lower leaf-spring 80 extends forwardly and contacts a lower boss 82 of swing arm 46. Leaf-spring 80 biases arm 46 into the loaded position, generally horizontal in FIG. 3. When loaded, a lower read/record head 84 is held against the recording surface of disk 18 opposite to that surface which faces upper head 72. Lower swing arm 46 achieves the open or retracted position by pivoting counterclockwise as viewed in FIG. 3.

Head 84 is attached to the distal end of a lower gimbal spring 86. The proximal end of spring 86 is fastened to a lower projection 88 of swing arm 46. Lower gimbal 86, like upper gimbal 68, functions as a cantilever in supporting its associated head for movement toward and away from the associated swing arm.

Control of lower arm 46 in its movement between the load and retract positions is accomplished by solenoid 56 as it controls upper arm 44. No separate mechanism is required due to an upper shoulder 90 projected from upper swing arm 44, and a lower shoulder 92 extended from swing arm 46. As seen from FIG. 3, when solenoid 56 is energized, leaf-springs 52 and 80 maintain arms 44 and 46 in the loaded position. Cutting off power to the solenoid permits armature spring 64 to pivot upper swing arm 44 in the clockwise direction, swinging upper shoulder 90 against lower shoulder 92. Continued movement causes counterclockwise pivoting of arm 46 until both arms are retracted. When solenoid 56 is re-energized, upper swing arm 44 is allowed to return to the load position, removal of shoulder 90 as an impediment to shoulder 92 thus allowing the return of lower arm 46 to the load position.

During normal operation of disc drive mechanism 10, solenoid 56 remains energized and swing arms 44 and 46 remain in the load position. The retracted or open position is used as a matter of convenience in loading and unloading cartridges similar to cartridge 16. The movement of heads 72 and 84 relative to their associated recording surfaces is accomplished by rotation of disc 18 and by the radial movement of carriage 32, all with heads 68 and 84 loaded, that is in slidable surface contact with disc 18.

As previously stated, the centerline spacing between adjacent tracks is 0.53 mm, and for this reason, the proper positioning of the heads with respect to the recording surfaces is extremely critical. The means for mounting the heads takes this into account, as can be shown from the detailed drawing of upper gimbal spring 68 in FIG. 5. The gimbal spring includes a base 94 which is mounted to upper projection 70 by spot welding or other satisfactory method. Extending from the base and parallel to one another are a first leg 96 and a second leg 98. A first transverse band 100 and a second transverse band 102, extended from legs 96 and 98, respectively, connect the legs to a head support flexure, more specifically to an outer ring 104. A first longitudinal band 106 and a second longitudinal band 107 link outer ring 104 to a gimbal platform 108. Shown in phantom, head 72 is attached to platform 108 using epoxy or the like. A dimple 110 is formed in platform 108, rising above the platform and in vertical alignment with the center of head 72. Between legs 96 and 98, gimbal spring 68 includes a base extension 112 to which is mounted (e.g., by spot welding) an upper stiffener or load arm 114. As is perhaps best seen from FIGS. 9–11, stiffener 114 has an end 116 in constant contact with dimple 110. The stiffener is spring loaded and substantially more rigid than legs 96 and 98, and continually biases head 72 away from swing arm 44. During operation of disc drive mechanism 10, the stiffener urges head 72 against disc 18.

Figure 5:
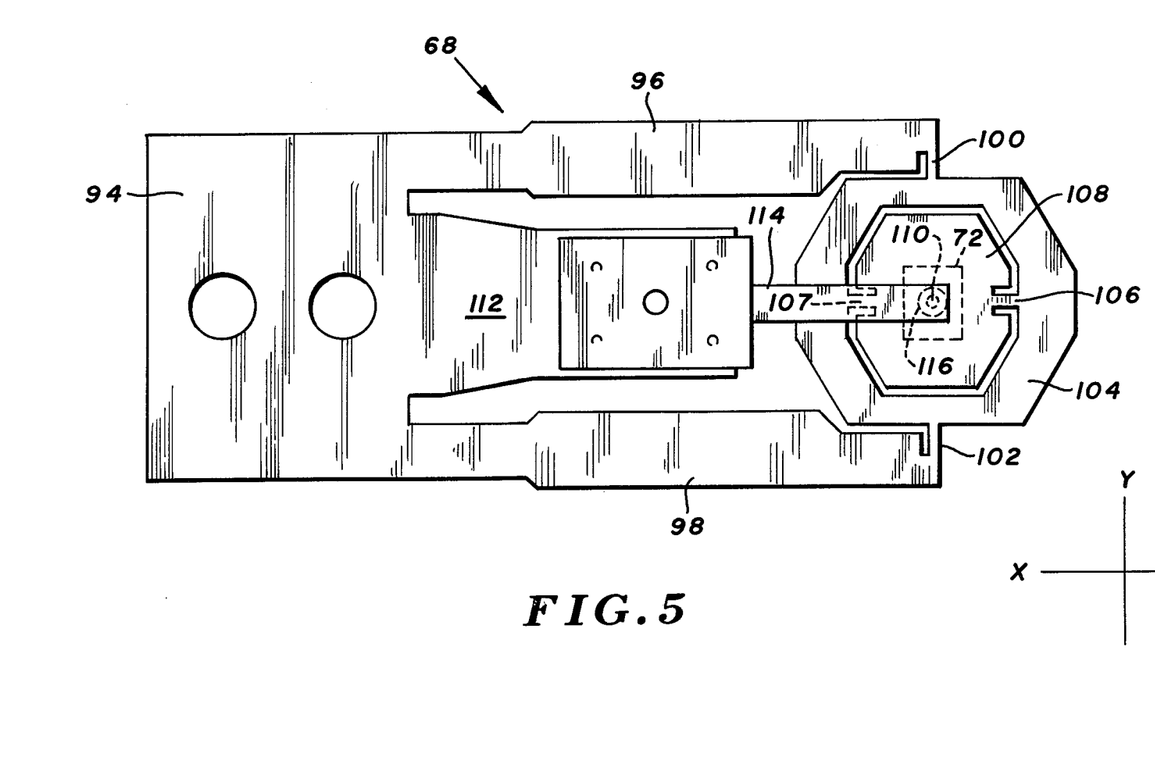
FIG. 5 is a sectional view taken along the lines 5—5 in FIG. 3 showing a gimbal spring as used in the drive.

The contact area between dimple 110 and stiffener 114 provides a universal connection allowing pivotal movement of gimbal platform 108 (and head 72) in two orthogonal directions: about a pitch axis labeled as "X" in FIG. 5, and about a roll axis, that is axis "Y". The pitch and roll axes are normal to the direction of head travel toward and away from its associated swing arm. Extremely rapid rotational response is required about both the pitch and roll axes due to unavoidable surface irregularities in disc 18. The achievement of rapid response is largely a matter of material selection and shape of the head support flexure. Transverse bands 100 and 102 are sufficiently thin to provide virtually no resistance to torsion, that is, a twisting to allow rotation of outer ring 104 with respect to legs 96 and 98. This allows rapid rotation about the roll axis. Similarly, longitudinal bands 106 and 107 allow very rapid rotation about the pitch axis, i.e., rotation of gimbal platform 108 with respect outer ring 104.

Gimbal spring 68 and the substantially identical lower gimbal spring 86 provide for extremely rapid response in both the pitch and roll directions. This enables the heads to follow any surface irregularities in the disc surface. Meanwhile, each stiffener continually urges its associated head against disc 18, enabling adjustment to undulations in the disc as it is rotated in mechanism 10.

The gimbal spring design gives rise to problems whenever the heads become separated from the disc recording surfaces. The structure which allows rapid pitch and roll response, namely the longitudinal and transverse bands, also creates instability which results in uncontrolled head attitude during take-off (retraction) and landing (loading). This typically takes the form of sinusoidal vibration, and can cause a rebounding of the head against the surface of the disc especially during take-off. A related problem occurs during loading, as heads 72 and 84 can contact the disc surface unevenly. The result is denting and nicking of the disc and head, reducing their effectiveness and useful life. A gimbal spring sufficiently sturdy to control the free swinging of the head sacrifices the advantage of rapid pitch and roll capability.

One attempt to reduce this problem, shown in U.S. Pat. No. 4,089,029 to Castrodale et al, is to mount fingers integral with the stiffener or load arm. These fingers, one on each side of the head and between the gimbal spring and recording surface, eventually engage the gimbal spring as the swing arm is retracted from the disc. However, as the fingers are integral with the stiffener, the stiffener must be separated from the gimbal spring dimple before the fingers can engage the gimbal spring. Two problems result from this. First is the obvious freedom in the gimbal spring and head to undulate during the span of time in which the gimbal is free from the stiffener and the fingers. Secondly, with every retraction the stiffener must be removed from the gimbal spring dimple, and it must be re-applied to the dimple before normal operation is resumed. The sudden application of stiffener force to the dimple sends shocks through the mechanism, particularly at the head. Such repeated applications of load arm force interfere with head performance and reduce head and disc life.

Figures 6, 7, 8:
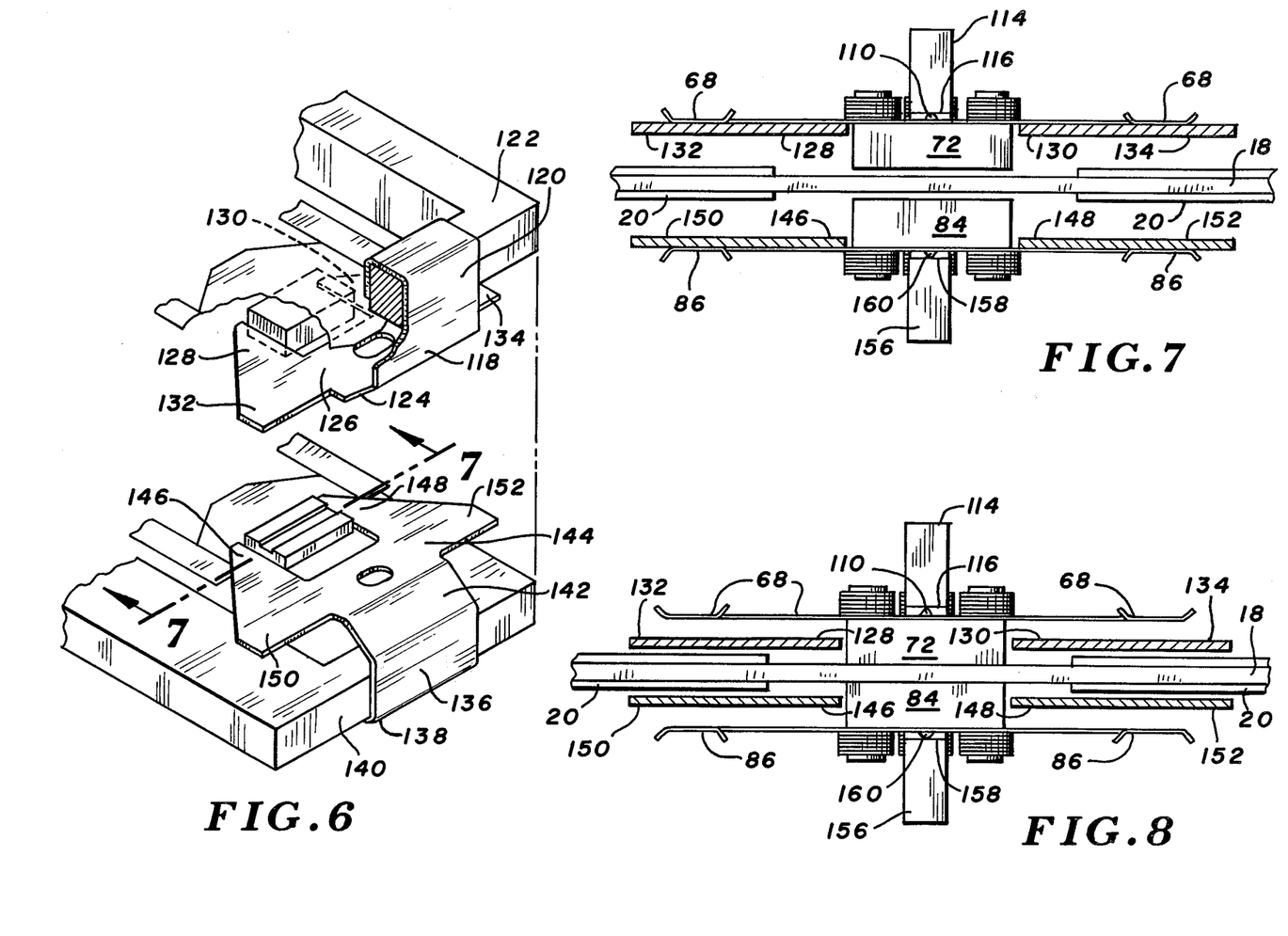
FIG. 6 is a perspective cutaway view of the upper and lower swing arms, gimbal springs and retainers of the disc drive.
FIG. 7 is a sectional view taken along the lines 7—7 in FIG. 6 showing the swing arms in the retracted position.
FIG. 8 is a sectional view similar to that of FIG. 7 but showing the swing arms in the loaded position.

The present invention enables the use of a highly responsive gimbal spring, positively controls head attitude throughout landing and take-off, and eliminates the problem of shock from the stiffener through the continual retention of the stiffener against the gimbal spring dimple. As seen in FIG. 6, a detent means is shown in connection with both upper and lower swing arms 44 and 46. Mounted to upper swing arm 44 is an upper retainer or detent 118. The retainer has a generally U-shaped clamping portion 120 adapted to grip an upper cross bar 122 of arm 44. A ramp 124 extends angularly, at approximately 45°, from the forward wall of clamp 120. Extending horizontally from the ramp is a landing or lift 126. The landing can be considered to comprise two functionally separate elements. First it includes first and second prongs 128 and 130. Prongs 128 and 130 extend rearwardly, each on one side of upper head 72. Secondly, the landing includes first and second wing portions 132 and 134. These wings extend essentially transversely of swing arm 44, and perform a function distinct from that of the prongs as will be later explained.

Similarly, lower swing arm 46 is provided with a lower retainer 136, which has a U-shaped clamping portion 138 adapted to grip a lower cross bar 140 of arm 46. Extending from clamping portion 138 are a ramp 142, and then a landing 144 which is parallel to the plane of the swing arm, i.e., generally horizontal. Landing 144 includes first and second lower prongs 146 and 148, respectively, and first and second lower wing portions 150 and 152.

FIGS. 7 and 8 show, respectively, the upper and lower swing arms retracted and then in the load position. With the heads retracted, landing 126 is engaged with upper gimbal spring 68. End 116 of upper stiffener 114 is in contact with dimple 110, and urges the dimple and head 72 away from swing arm 44, or downwardly as viewed in FIG. 7. Retainer 118 prevents further downward movement of the head. Likewise, in connection with lower swing arm 46, lower landing 144 is in surface contact with lower gimbal spring 86. This prevents further movement of the gimbal spring and lower head 84 toward disc 18, in spite of the force from a lower stiffener 156 through its lower end 158 against a lower gimbal spring dimple 160.

FIG. 8 is identical to FIG. 7 except that heads 72 and 84 are loaded on disc 18. Landing 126 is completely free of upper gimbal spring 68, and similarly lower landing 144 is entirely free of lower gimbal spring 86. Contact of stiffener 114 against dimple 110, and of lower stiffener 156 against lower dimple 160 is retained. During reading and recording the stiffeners force the heads into contact with the disc. The heads are then free to respond to disc undulations and surface irregularities. For example, suppose a disc undulation results in upward movement as viewed in FIG. 8. This of course would force transducer 72 upward, and along with it, gimbal spring 68 and stiffener 114. Lower stiffener 156, acting through lower dimple 160, would urge head 84 upward to follow disc 18 in its upward movement. As another example, if a disc surface irregularity causes a slight shift in the recording surface out of its horizontal configuration equivalent to a rotation about the pitch axis, both heads can follow such a shift: upper head 68 through a rotation or pivoting about the contact area between dimple 110 and stiffener 114, and lower head 84 by pivoting about the contact area between lower dimple 160 and lower stiffener 156.

Wings 132 and 134, and lower wings 150 and 152, perform a function which is best understood from viewing FIG. 8. Surface irregularities and wrinkles in the jacket can interfere with reading and recording by aggravating the effects of undulations of the disc 18. Upper wings 132 and 134, along with lower wings 150 and 152, extend beyond the width of slots 26 and tend to smooth out any wrinkles or bulges in the disc jacket along the slots. Secondly, they tend to compress jacket 20 in the area of slot 26, thus limiting the amplitude of disc undulation. Reducing the amplitude enhances reading and recording operations, since the amount of vertical adjustment required in the heads is reduced.

Figure 9:
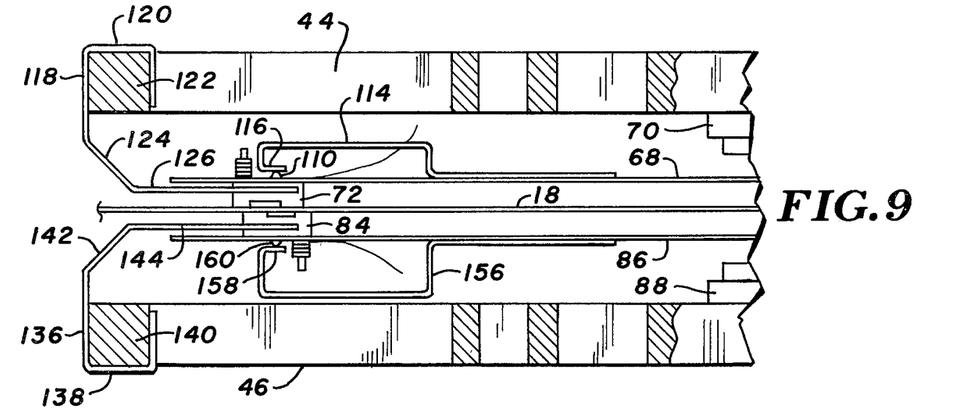
FIG. 9 is an enlarged partial view of FIG. 3 showing the swing arms in the loaded position.
Figure 10:
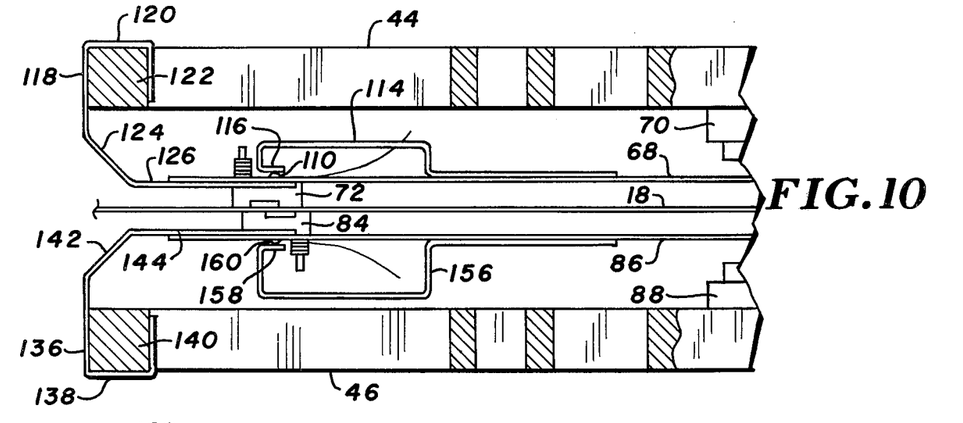
FIG. 10 is a view similar to that in FIG. 9 but showing the swing arms in an intermediate position between the loaded and retracted positions.
Figure 11:
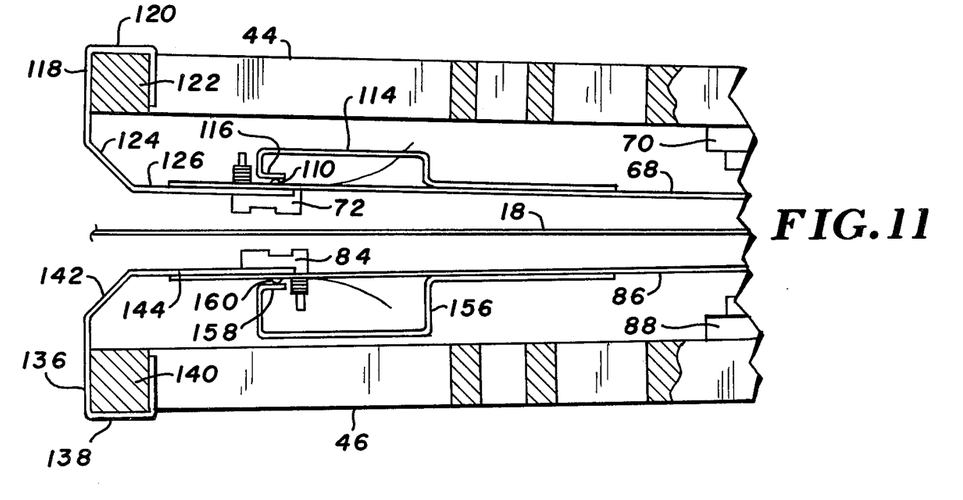
FIG. 11 is a view similar to that in FIG. 9 showing the swing arms in the retracted position.

FIGS. 9–11 illustrate movement of the upper and lower swing arms from the loaded to the retracted position. In FIG. 9 the heads are loaded as they are shown in FIG. 8. Landings 126 and 144 are entirely free of their associated gimbal springs 68 and 86. Heads 72 and 84 are then free to rotate about the roll axis in response to disc irregularities, particularly head 72 by rotation about the surface contact area between dimple 110 and stiffener 114, and head 84 by rotation about the contact area betwen dimple 160 and stiffener 156.

As swing arms 44 and 46 are retracted, i.e., moved from the position shown in FIG. 9 toward the position shown in FIG. 11, the associated retainers 118 and 136 move away from disc 18, and also move relative to the associated gimbal springs 68 and 86. This is because stiffeners 114 and 156 maintain the heads against the disc recording surfaces. Continued retraction brings retainer landing 126 into contact with the head support flexure of gimbal spring 68. Likewise, lower landing 144 is brought against the head support flexure of gimbal spring 86. This configuration is shown in FIG. 10. Heads 72 and 84 remain in contact with disc 18, and stiffeners 114 and 156 remain in contact with dimples 110 and 160, respectively. For the instant of time represented in FIG. 10, each head is stabilized against undulation not only by surface contact with disc 18, but also by contact between its associated gimbal spring and retainer landing.

As the retraction continues, swing arms 44 and 46 move from the configuration shown in FIG. 10 toward the retracted configuration shown in FIG. 11. As illustrated, both heads are completely free of disc 18. Also, the contact between stiffener 114 and dimple 110 is retained, as is that between stiffener 156 and dimple 160. Each load arm or stiffener urges its associated head toward the disc and away from its associated swing arm. Further movement of each head toward the disc is prevented by the contact between its associated retainer and gimbal spring.

In considering the transition between FIGS. 10 and 11, it is understood that just as transverse extension of the landing is sufficient to prevent head rotation about the pitch axis (FIG. 7), the rearward extension of landings 126 and 144 (from left to right as viewed in FIG. 10) is sufficient to prevent rotation about the roll axis. Finally, the wings which extend transversely over the slot in the jacket further confine the disc 16, reducing the amplitude of disc undulations, and accordingly the requirement that the gimbal springs and stiffeners adjust to extreme disc movement normal to its surface.

The purpose of ramps 124 and 142 can be understood from FIGS. 9-11. As previously noted, positioning of the head from one track to another involves movement of the carriage radially of disc 16, to the left or to the right as viewed in FIGS. 9-11. The angular orientation of ramps 124 and 142 reduces the possibility that either retainer 118 or 136 could catch or rub against jacket 20 and interfere with smooth motion of the carriage.

The use of upper and lower retainers on the swing arms enables positive attitude control of each head during landing and take-off. This enables use of substantially more flexible gimbal springs for improved following of pitch and roll movements, as the gimbal springs need no longer be capable of solely supporting the heads. While the invention is perhaps most advantageously applied to the double-sided flexible disc mechanism, it is applicable as well to the single-sided flexible disc, and could be installed in disc drives designed for rigid discs, one difference being that each read/record head, rather than sliding along the disc recording surface, rides on a minute cushion of air in spaced apart relation to the disc. Another important advantage of the invention is the continual retention of the stiffener against the gimbal spring dimple. Since the stiffener need not be applied to the dimple each time the head lands upon the disc surface, the shocks from repeated collisions between the stiffener and dimple are eliminated.

What is claimed is:

1. In an electronic data reading and recording apparatus including a housing; means for supporting a magnetic disc for rotation with respect to said housing; a carriage, and means for moving said carriage radially with respect to said disc: at least one swing arm mounted pivotally to said carriage; a head carrier mounted at its proximal end to each said swing arm, and having at its distal end a head support flexure supporting a transducing head for generally linear movement toward and away from said swing arm, and further supporting the head for pivotal movement on two axes substantially perpendicular to the direction of said linear movement and to each other; a moving means for pivoting each said swing arm between a load position wherein said head is positioned in a reading and recording relation to said disc, and an open position wherein said head is remote from the disc; and detent means integral with each said swing arm, said detent means having a landing substantially parallel to the plane of said swing arm for engaging said flexure upon movement of said head a predetermined distance from said swing arm, thereby preventing further movement of said head away from said arm, and, when so engaged, preventing said pivotal movement.

2. The apparatus of claim 1 wherein:
said landing includes two prongs extended along the width of said head and on opposite sides thereof.

3. The apparatus of claim 1 wherein:
said carrier includes a leaf spring mounted at it proximal end as a cantilever to said swing arm and extended toward the forward end of said swing arm.

4. The apparatus of claim 3 wherein:
said landing includes two prongs extended along the width of said head and on opposite sides thereof.

5. The apparatus of claim 4 wherein:
said disc is enclosed in a jacket having a radially directed elongated slot through which said head has access to said disc, said landing including two wing portions extended transversely of the swing arm in opposite directions from the head to span a distance greater than the width of said slot.

6. The apparatus of claim 1 including:
two opposed swing arms; said heads, when in said load position, opposed to one another and in slidable contact with opposite surfaces of said disc.

* * * * *